Dec. 13, 1960     S. J. STOCKWELL     2,964,601
ELECTRICALLY OPERATED MARINE ENGINE GEAR SHIFT
Filed Oct. 30, 1957     2 Sheets-Sheet 1
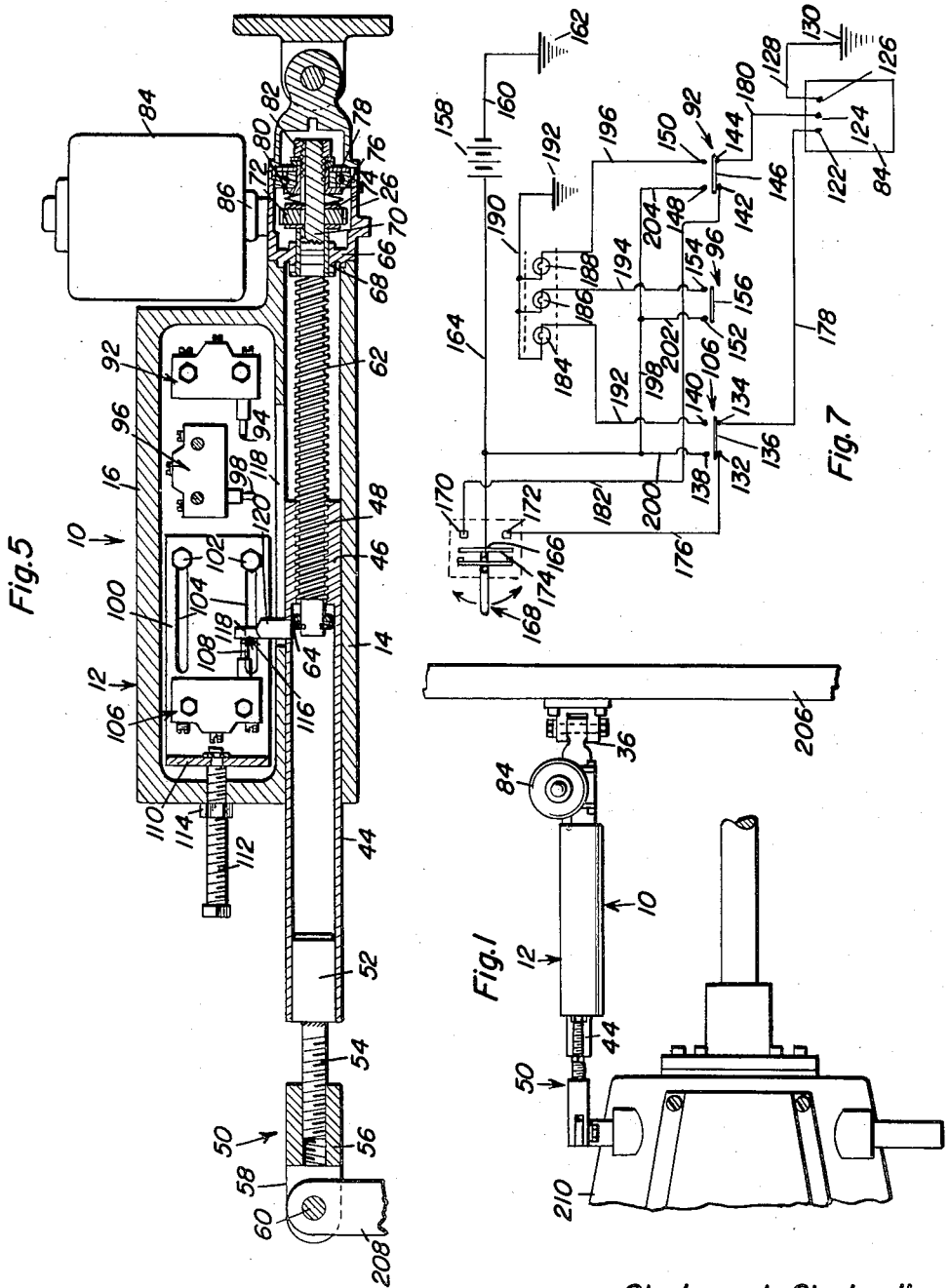
Stephen J. Stockwell
INVENTOR.
BY *Clarence A. O'Brien*
*and Harvey B. Jacobson*
Attorneys Dec. 13, 1960 S. J. STOCKWELL 2,964,601
ELECTRICALLY OPERATED MARINE ENGINE GEAR SHIFT
Filed Oct. 30, 1957 2 Sheets-Sheet 2
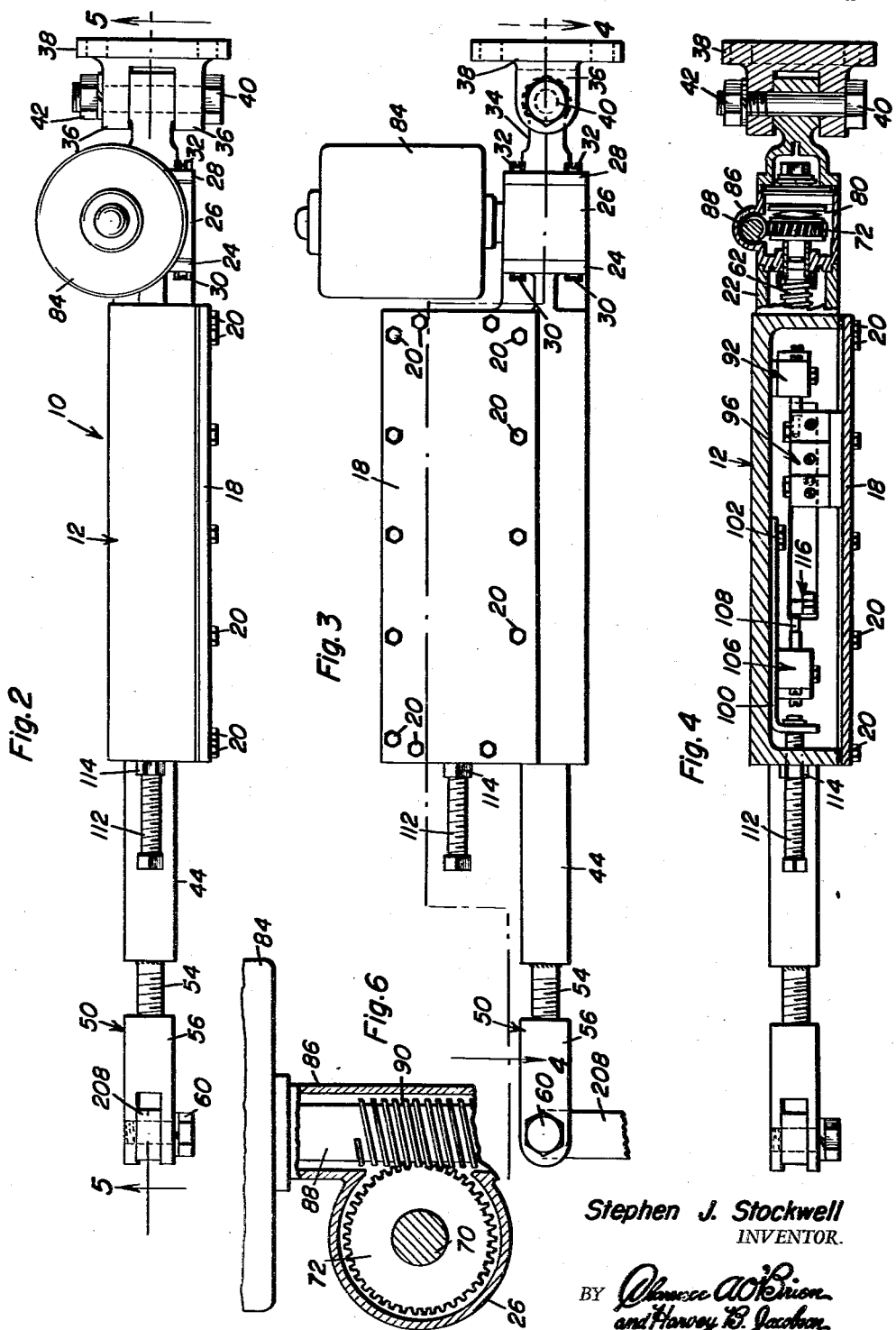
Stephen J. Stockwell
INVENTOR.

United States Patent Office 2,964,601
Patented Dec. 13, 1960

2,964,601

ELECTRICALLY OPERATED MARINE ENGINE GEAR SHIFT

Stephen J. Stockwell, 333 Broadway, Marine City, Mich.

Filed Oct. 30, 1957, Ser. No. 693,278

2 Claims. (Cl. 200—47)

This invention relates in general to new and useful improvements in shift mechanisms, and more specifically to an electrically operated marine engine gear shift.

The primary object of this invention is to provide an improved shift mechanism which is operated by the electric motor and which is so constructed whereby the limits of the shift may be readily controlled by means of limit switches.

Another object of this invention is to provide an improved shift mechanism which may be conveniently mounted with respect to any mechanism for the operation of the mechanism backwards and forwards as is deemed necessary, the shift mechanism including an electric motor which drives a feed screw which in turn has threadedly engaged thereon a nut which may be attached to the member to be shifted, there being provided suitable controls for operating the electric motor to position the nut on the feed screw.

Another object of this invention is to provide an improved drive for a shift mechanism, the drive including a feed screw, there being threadedly engaged on the feed screw a nut which is mounted for sliding movement only through a frame, there being provided a reversible electric motor, the electric motor being connected to the feed screw for selectively driving the feed screw in either a clockwise or counterclockwise direction whereby the nut may be advanced or retracted as desired.

A further object of this invention is to provide an improved shift mechanism which may be used for shifting articles of all types including a marine gear shift, steering and the like, the shift mechanism including a reversible motor which will permit operation of the shift mechanism in selected directions, and there being a feed screw having a nut threadedly engaged thereon, the control for the electric motor including individual switches for operating the electric motor and limit switches for limiting the operation of the electric motor to shift the nut a predetermined distance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a fragmentary portion of a boat and shows the shift mechanism which is the subject of this invention mounted in the boat for operating the gear shift of the marine engine of the boat;

Figure 2 is an enlarged plan view of the shift mechanism removed from the boat and shows the specific details thereof;

Figure 3 is an enlarged elevational view of the shift mechanism and shows further the details thereof;

Figure 4 is an enlarged fragmentary horizontal sectional view taken substantially upon the plane indicated by the section line 4—4 of Figure 3 and shows the details of the means for driving the feed screw and the general details of limit switches of the drive mechanism;

Figure 5 is an enlarged fragmentary vertical sectional view taken substantially upon the plane indicated by the section line 5—5 of Figure 2 and shows further the details of the internal mechanism of the shift mechanism;

Figure 6 is an enlarged fragmentary sectional view showing the details of the gearing connecting the electric motor to the feed screw and Figure 7 is a wiring diagram for the control of the electric motor.

Referring now to the drawings in detail, it will be seen that there is illustrated the shift mechanism which is the subject of this invention, the shift mechanism being referred to in general by the reference numeral 10. The shift mechanism 10 includes a frame which is referred to in general by the reference numeral 12. The frame 12 is preferably in the form of a casting, but may be otherwise constructed. The frame 12 includes a reduced lower portion in the form of a sleeve portion 14 which is formed integral on the underside of a housing 16. The housing 16 is hollow and is provided with a removable cover plate 18 which is secured in place by a plurality of bolts 20. Also, the sleeve portion includes an enlarged extension 22 which extends to the right of the housing 18 and which is provided with a mounting flange 24. Secured to the mounting flange 24 is a gear housing 26 which is provided with a cover plate 28 which also functions as a mounting flange. The mounting flange 24 is secured to the gear housing 26 by means of suitable bolts 30 and similar bolts 32 are used to secure the mounting flange 28 to the gear housing 26.

In order that the frame 12 may be suitably mounted on any desired support, there is formed integral with the mounting flange 28 a fitting 34 which is connected to a fitting 36 of a supporting bracket 38 by means of a pivot pin 40. The pivot pin 40 is in the form of a bolt which is provided with a nut 42 which may be tightened to prevent pivoting of the fitting 38 with respect to the mounting bracket 36.

Referring now to Figure 5 in particular, it will be seen that there is slidably mounted in the sleeve portion 14 of the frame 12 an elongated tubular nut 44. The nut 44 includes an end portion 44 which is provided with internal threads 48. The nut 44 extends out of the sleeve portion 14 to the left and carries a connector which is referred to in general by the reference numeral 50. The connector 50 includes a plug 52 which is secured in the free end of the nut 44. The plug 52 carries an externally threaded stud 54 on which there is threadedly engaged a fitting 56. The fitting 56 is of the bifurcated type and includes a pair of ears 58 which carry a connecting pin 60.

Carried by the gear housing 26 is a feed screw 62 which extends into the sleeve 14 and which is threadedly engaged with the nut 44. The feed screw 62 extends into the nut 44 and is provided at the end thereof with a retaining ring 64 to prevent the feed screw 62 from feeding the nut 44 off of the end thereof.

The gear housing 26 includes an end wall 66 in which there is mounted a bushing 68. Rotatably journaled in the bushing 68 is a non-threaded end portion 70 of the feed screw 62. Rotatably journaled on the end portion 70 is a worm wheel 72 which is provided with a pressure plate 74. Keyed to the end portion 70 for rotation therewith is a drive plate 76 which in turn carries a bearing 78 which assists in the rotatable journaling of the feed screw 62. Disposed intermediate the pressure plate 74 and the drive plate 78 is a spring type clutch element which forms a major part of an overload slip type clutch. The clutch is adjusted by means of an adjusting nut 82 threadedly engaged in the extreme right hand end of the feed screw 62 so as to vary the torque which will be required to make the clutch slip.

Carried by the gear housing 26 and extending upwardly therefrom is an electric motor 84 which is of the reversible type. The electric motor 84 is preferably of the D.C. current type although other types of electric motors may be used. The electric motor includes a drive shaft housing 86 which is secured to the gear housing 26 for the purpose of supporting the electric motor 84.

As is best shown in Figure 6, the electric motor 84 includes an armature shaft 88 which either has formed integral therewith or has mounted thereon a worm gear 90. The worm gear 90 is meshed with the worm wheel 72 to effect the driving of the feed screw 66.

Mounted within the housing 16 adjacent the right end thereof is a right limit control switch 92 which includes an actuator 94. Mounted in the central part of the housing 16 is a neutral indicator switch 96 which includes an actuator 98.

Also carried by the housing 16 is a mounting bracket 100 which is secured in place on the frame 12 by means of a pair of bolts 102. The bolts 102 are received in elongated slots 104 in the mounting bracket 100 so as to permit longitudinal sliding of the mounting bracket. Carried by the mounting bracket 100 is a left limit switch 106 which includes an actuator 108.

In order that the left limit switch 106 may be selectively positioned within the housing 16, the mounting bracket 100 also includes a flange 110. The flange 110 has connected thereto a positioning screw 112 which is threadedly engaged in the frame 12. The adjusting screw 112 is provided with a lock nut 114 to retain it in adjusted position.

In order that the switches 92, 96 and 106 may be operated, there is secured to the nut 44 a finger 116. The finger 116 extends upwardly into the housing 16 through an elongated slot 118 which communicates the housing 16 with the sleeve portion 14. The finger 116 includes a main part 118 and a reduce part 120. The main part 118 is so positioned so as to engage the actuators 108 and 94 and the reduced part 120 engages the actuator 98.

Referring now to Figure 7 in particular, it will be seen that there is illustrated the wiring diagram for the shift mechanism. The electric motor 84 is provided with terminals 122, 124 and 126. The terminal 126 is connected by means of a wire 128 to a ground 130.

The left limit switch 106 includes a first pair of contacts 132 and 134 which are normally bridged by a contacting bridging number 136. The left limit switch 106 also includes a second pair of contacts 138 and 140 which are bridged by the contact bridging member 136 when the actuator 108 of the switch 106 is actuated.

The right limit switch 92 includes a pair of contacts 142 and 144 which are normally bridged by a contact bridging member 146. The switch 92 also includes a pair of contacts 148 and 150 which are bridged by the contact bridging member 146 when the actuator 94 is actuated.

The switch 96 includes a pair of contacts 152 and 154 which are bridged by a contact bridging member 156 when the actuator 98 is actuated.

The wiring circuit for the electric motor 84 also includes a power source, such as a battery 158. The battery 158 is grounded by means of a wire 160 to a ground 162. The battery 158 is also connected by a wire 164 to a central terminal 166 of a control switch 168. The control switch 168 is of the double throw single pole type and includes a pair of contacts 170 and 172 which are selectively engaged by a circuit maker 174, the central terminal 166 being part of the circuit maker 174.

The contact 172 is connected to the contact 132 by means of a wire 176. The contact 134 is connected to the terminal 122 by means of a wire 178. The terminal 124 is connected to the contact 144 by means of a wire 180. The contacts 170 and 142 are connected together by means of a wire 182.

In addition to the various control switches, there are also provided control lights which include a left limit light 184, a neutral position light 186 and a right limit light 188. The lights 184, 186 and 188 are connected by a common lead wire 190 to a ground 192. The light 184 is connected to the contact 140 by means of a wire 192. The light 186 is connected to the contact 154 by means of a wire 194. The light 188 is connected to the contact 150 by means of a wire 196. There is also provided a common lead wire 198 for the switches 106, 96 and 92, the common lead wire 198 being connected to the wire 164. Extending between the common lead wire 198 and the contact 138 is a wire 200. A similar wire 202 extends between the lead wire 198 and the contact 152. The contact 148 is connected to the lead wire 198 by a wire 204.

When it is dseired to move the nut 44 to the left, the switch 168 is actuated so that the circuit maker 174 engages the contact 172. This results in the energization of the electric motor 84 to drive the feed screw 62 in the necessary direction to move the nut 44 to the left. When the nut 44 reaches the left end of its travel, the finger 116 will engage the actuator 108 so as to shift the contact bridging member 136 out of engagement with the contacts 132 and 134 and into engagement with the contacts 138 and 140. This will simultaneously deenergize the electric motor 184 and energize the bulb 184 to indicate that the nut 44 is at the left end of its travel.

When it is desired that the nut 44 move to the right end of its travel, the switch 168 is manipulated so that the circuit maker 174 engages the contact 170. The electric motor 84 will then be energized so as to turn the feed screw 62 in the opposite direction and thus feed the nut 44 to the right. As the nut 44 starts to the right, the actuator 108 is disengaged and the contact bridging member 136 returns to its normal position thus causing the lamp 184 to no longer be lighted. When the nut 44 reaches a central position, the actuator 98 will be engaged and the switch 96 closed. This will light the neutral indicator lamp 186 and if it is desired to place the shift mechanism 10 in the neutral position, the switch 168 is released. On the other hand, if it is desired that the shift mechanism extend to the right end of its travel, the switch 168 remains closed and the nut 44 continues to move to the right until the finger 116 engages the actuator 94 at which time the contact bridging member 146 is moved out of engagement with the contacts 142 and 144 so as to deenergize the motor 84 and into a position bridging the contacts 148 and 152 to light the lamp 188.

Referring now to Figure 1 in particular, it will be seen that the shift mechanism 10 is illustrated as being mounted in a boat. The shift mechanism 10 is carried by a frame member 206 of the boat and the connector 50 is connected to a shift arm 208 of the gear box 210 of the marine engine (not shown) of the boat. Thus the shift mechanism 10 may be utilized to shift the gears of the boat from a remote point.

While only one special application of the shift mechanism 10 has been illustrated and described, it is to be understood that the invention is not intended to be so limited. The shift mechanism 10 may be used in any installation that is desired. It will be readily apparent that the shift mechanism 10 is provided with simple mounting features and a simple connector whereby it may be mounted in almost any position and connected to almost any type of device which may be controlled by reciprocatory movement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A power operated gear shifter comprising frame means, power means mounted on said frame means, screw means rotatably mounted in said frame and drivingly connected to said power means, nut means threadedly engaged with said screw means and slidably mounted in said frame means, a first independently actuated limit switch means fixedly mounted on said frame means, a second independently actuated limit switch means slidably mounted on said frame means, adjustment means for mounting said second limit switch means only, in an adjusted position on the frame means, position indicating switch means fixedly mounted on said frame means, switch actuating means connected to said nut means and engageable with each of said switch means upon movement thereof by said power means, control means operatively connected to said power means for selectively energizing said power means and operative to deenergize the power means in response to actuation of said limit switch means by said switch actuating means.

2. The power operated gear shifter as defined in claim 1, wherein said position indicating switch means is disposed between the first and second limit switch means.

References Cited in the file of this patent

UNITED STATES PATENTS

| | | |
|---|---|---|
| 2,490,040 | Frerer | Dec. 6, 1949 |
| 2,607,834 | Connors | Aug. 19, 1952 |
| 2,661,450 | Moler | Dec. 1, 1953 |
| 2,779,838 | Reis | Jan. 29, 1957 |